Figure 1:
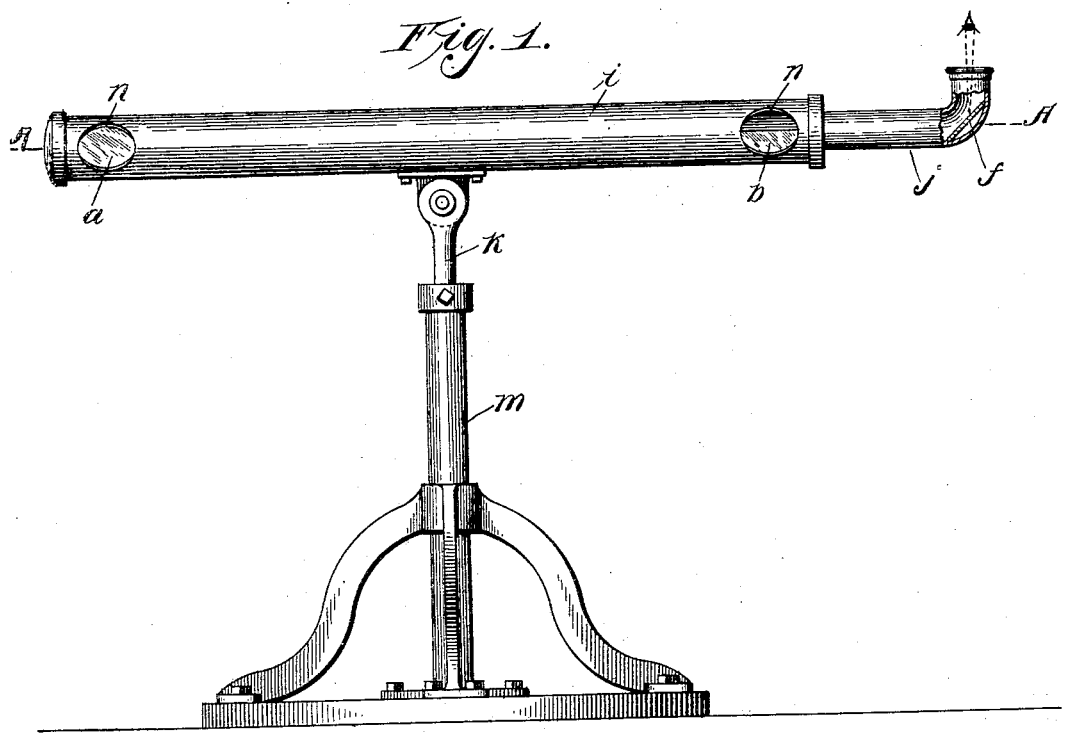

No. 738,155. PATENTED SEPT. 8, 1903.
T. D. BROWN & G. W. & J. H. HAUSE.
APPARATUS FOR MEASURING DISTANCES OF DISTANT OBJECTS.
APPLICATION FILED NOV. 12, 1902.
NO MODEL. 2 SHEETS—SHEET 1.

Witnesses:
Louis D. Heinrichs
R. M. Kelly

Inventors
Thomas D. Brown
George W. Hause
Joseph H. Hause
By their atty

No. 738,155. PATENTED SEPT. 8, 1903.
T. D. BROWN & G. W. & J. H. HAUSE.
APPARATUS FOR MEASURING DISTANCES OF DISTANT OBJECTS.
APPLICATION FILED NOV. 12, 1902.
NO MODEL. 2 SHEETS—SHEET 2.
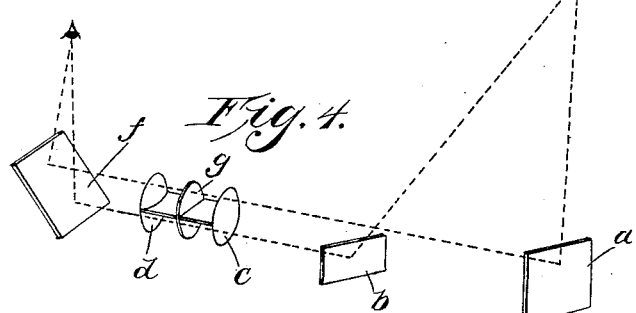
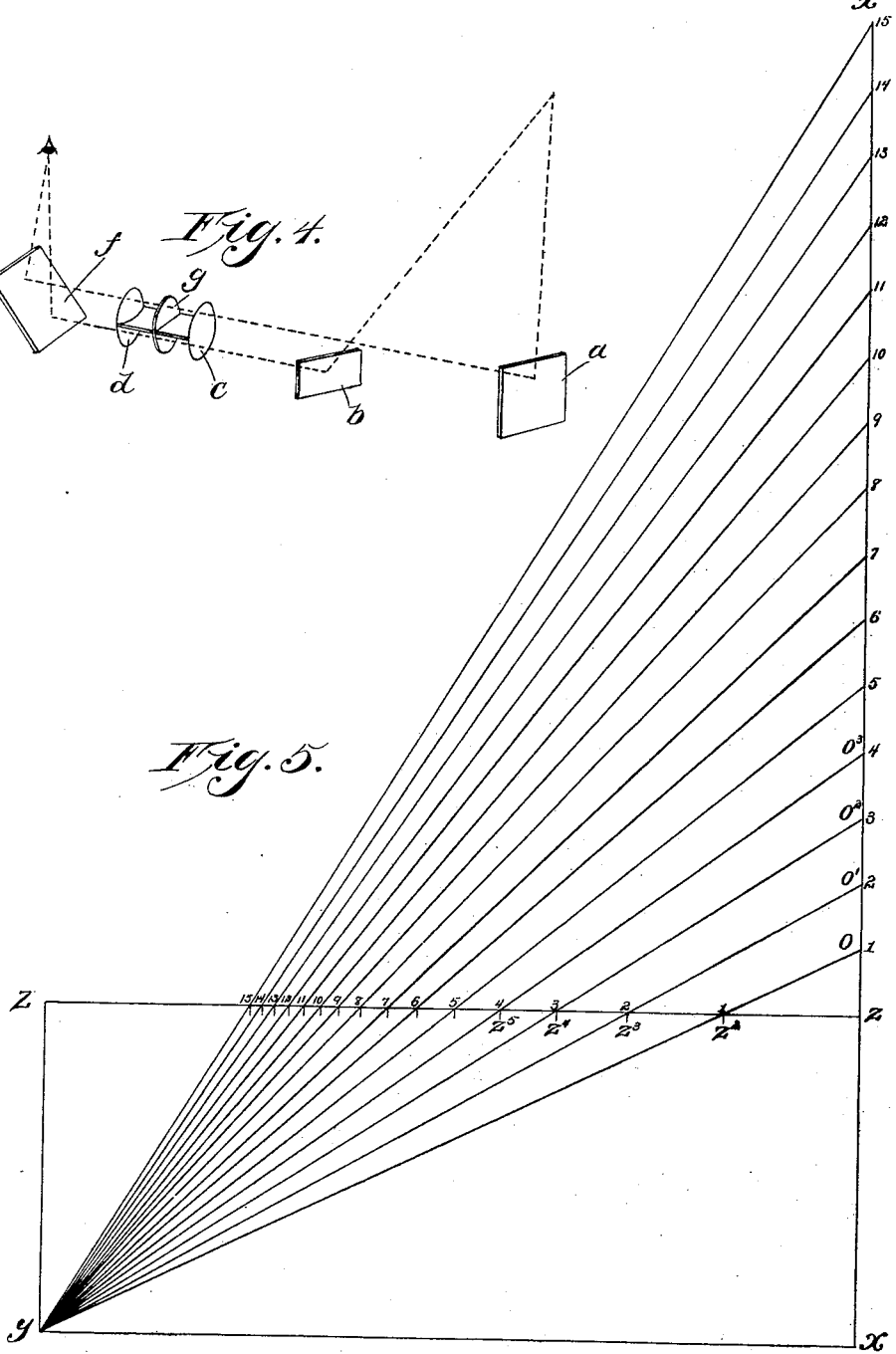

No. 738,155. Patented September 8, 1903.

UNITED STATES PATENT OFFICE.

THOMAS D. BROWN, GEORGE W. HAUSE, AND JOSEPH H. HAUSE, OF PHILADELPHIA, PENNSYLVANIA, ASSIGNORS TO THEMSELVES, TRADING AS AUTOMATIC MEASURING MACHINE COMPANY OF AMERICA, OF PHILADELPHIA, PENNSYLVANIA.

APPARATUS FOR MEASURING DISTANCES OF DISTANT OBJECTS.

SPECIFICATION forming part of Letters Patent No. 738,155, dated September 8, 1903.

Application filed November 12, 1902. Serial No. 130,975. (No model.)

*To all whom it may concern:*

Be it known that we, THOMAS D. BROWN, GEORGE W. HAUSE, and JOSEPH H. HAUSE, of the city and county of Philadelphia, State of Pennsylvania, have invented an Improvement in Apparatus for Measuring the Distance of Distant Objects, of which the following is a specification.

This invention is designed to enable the distance of distant objects to be measured accurately and instantly by a single instrument and one observer and without the necessity of making calculations. It is based, primarily, on the law of optics that if the same object be viewed simultaneously from two different positions the distance between the two lines of vision will be proportional to the distance of the object from the observers—*i. e.*, it will be proportional to the angle at the object between the two lines of vision. In applying this principle to practice we substitute for the two observers two reflectors located at a distance apart and each adapted to receive and reflect an independent image of the object upon the object-glass, which images by reason of the difference in the angle of reflection will be separated one from another a distance proportional to the distance of the object from the reflectors. By making the outer or most distant reflector of sufficient size these two images may be reflected to the object-glass one above the other, and by placing between the lens and object-glass a partition arranged in a plane intersecting the object-glass between these two images, the confusion of the images refracted by the object-glass is prevented and the two distinct images are received by the retina of the eye of the observer. By arranging a scale between the object-glass and lens laid off in distances proportional to the differences in the angles formed at the object by the rays of reflection of the two reflectors for different distances of the object and expressed in terms of the distance the distance of the object from the reflectors and observer may be instantly determined by simply observing on the scale the distance between corresponding points on the two images.

The apparatus is monocular, since by reason of the separation of the two images, the retina of the eye will receive the two distinct images without confusion. It may be used for a great variety of purposes and for taking the distances of ships or other objects at sea, or lights and signals at night, or for measuring distances on land or height of mountains, &c. With a simple object-glass and lens the position of the images will be reversed; but they may be restored to true position by the interposition of a reflector or second lens.

Figure 2:
Figure 3:
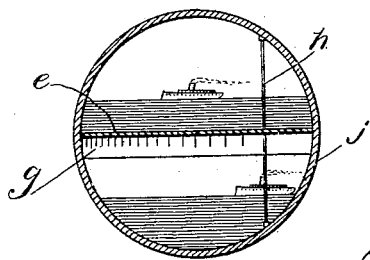

In the drawings, Figure 1 is a side elevation of a distance-measuring apparatus embodying our invention. Fig. 2 is a longitudinal horizontal sectional view of the same on the line A A of Fig. 1. Fig. 3 is a transverse section on the line B B of Fig. 2 on an enlarged scale. Fig. 4 is a diagram illustrating the location and action of the lenses and reflectors, and Fig. 5 is a diagram illustration of the manner of laying off the scale.

$a$ and $b$ are the reflectors, which receive and reflect the images of the object to be measured. They are arranged at a convenient distance apart, so that the rays from the object to the two reflectors will form an acute angle at the object, which is equivalent to viewing the object from two different positions. Of these reflectors the outer or more distant, $a$, is of greater height than the inner or nearer, $b$, so that the image received by it may be reflected over the inner reflector $b$. The two reflectors $a\ b$ are arranged parallel to one another and at an angle of forty-five degrees with reference to the object-glass $c$, which is located adjacent to the inner or nearer reflector $b$, so that the two images reflected by the reflectors $a$ and $b$ are transmitted to the object-glass $c$.

$d$ is the usual lens or eyepiece which is located in front of the object-glass $c$.

$e$ is a horizontal partition extending from the object-glass $c$ to the eyepiece $d$, which seems to prevent the confusion of the rays refracted by the object-glass, which, if permitted, would result in the confusion of the images. The retina will therefore receive two distinct images—one reflected from the outer or more distant reflector $a$ through the upper portion of the object-glass $c$ and above the partition $e$ and the other reflected from the inner or nearer reflector $b$ through the lower portion of the object-glass and below the partition $e$. One of these images will be above the other, and as the two distinct images are reflected from different angular positions with reference to the object one will be in advance of the other. These images, however, would be reversed in direction, and therefore we prefer to place a reflector $f$ between the lens $d$ and the eye to restore the images to their proper direction. This will bring the two images into the position shown in Fig. 3.

The horizontal distance between the two images depends on the distance between the two reflectors $a$ $b$ and the distance between the reflectors and the object—i. e., it will vary with the angle at the object between the two points of reflection. As the distance between the two reflectors is constant, the horizontal distance between the images will vary with the distance between the object and the reflectors—i. e., the distance of the object from the observer—and consequently by measuring the distance between the two images the distance of the object from the observer can be readily determined. For this purpose we arrange a micrometric scale in such position that it may be observed simultaneously with the observation of the two images and that the distance between the images, and consequently the distance of the object, from the observer may be instantly read off. In practice this scale is preferably arranged in the focus between the object-glass $c$ and the lens $d$.

The manner in which the scale is graduated is illustrated in Fig. 5. Let $x$ be the point of observation at which the reflector $a$ is placed and $y$ be the point of observation for the reflector $b$. The distance $x$ $y$ equals the distance between the two points of observation or the distance between the two points of reflection $a$ $b$. Take a line $z$ $z'$, parallel to the line between the points $x$ $y$. An observer at $x$ looking directly at an object one mile distant will observe it in a line $x$ $x'$ intersecting the line $z$ $z'$ at the point $z$; but an observer at $y$ looking at the same object will observe it in a line intersecting the line $z$ $z'$ at a point $z^2$. By projecting the line $y$ $z^2$ to the line $x$ $x'$ the point of intersection $o$ will give the distance $o$ $z$ on the line $x$ $x'$ for an object one mile distant and the distance $z$ $z^2$ on the line $z$ $z'$ will indicate for the two points of observation $x$ $y$ the distance of the object from the point $x$. By laying off on the line $x x'$ the distances $o'$, $o^2$, $o^3$, &c., for two, three, four, &c., miles and connecting those points with the point $y$ the intersections $z^3$, $z^4$, $z^5$, &c., of the lines $o'$ $y$, $o^2$ $y$, $o^3$ $y$, &c., with the line $z$ $z'$ will give the distances $z$ $z^3$, $z$ $z^4$, $z$ $z^5$, &c., indicating the distance of the two images for two, three, four, &c., miles with the point $z$ as the index-point. The scale $g$ thus graduated for the fixed distance between the reflectors $a$ $b$ is formed on a transparent strip or disk and is arranged in the focus between the lens $d$ and object-glass $c$ on one side of the partition $e$.

$h$ is an index-line arranged vertically across the scale $g$ over the index-point $z$, Fig. 5, in the direct line of reflection of the reflector $a$. It may be formed as a fine line drawn on the scale-disk, or it may be a thread, hair, or fine wire stretched across it.

In the prepared form of our apparatus the reflectors $a$ $b$ are fastened in a tube or cylinder $i$, with the object-glass $c$ mounted in the end in an opening, to which is fitted a short laterally-bent tube extension $j$, in which the lens $d$, partition $e$, scale $g$, and reflector $f$ are arranged in the relation described and as shown in Fig. 2. As shown, the cylinder $i$ is hinged to an extension-rod $k$, mounted in a pedestal $m$. By this means the elevation of the cylinder may be adjusted, and it may be turned or swung into any desired position to view the object. In practice we have found a distance of thirty-six inches between the reflectors $a$ $b$ as satisfactory. The side of the cylinder $i$ at the points where the reflectors $a$ $b$ are located is formed with openings $n$.

In using the apparatus—as, for example, on shipboard to measure the distance of a ship at sea—the tube $i$ is adjusted until the reflectors $a$ $b$ are presented to the object to reflect its image. The observer with his eye at the opening of the short tube $j$ will see two images of the object, the upper one reflected by the outer reflector $a$ and the lower reflected by the reflector $b$. For the reasons explained one of these images will be in advance of the other and the distance between the same point on each image will determine the distance of the object from the observer. This distance can be readily and instantly determined by adjusting the instrument to bring any given point on one image in line with the index $h$, when the distance of the like point on the other object can be instantly read off from the scale $g$ in terms of the distance of the object from the observer.

We do not mean to limit ourselves to the details of construction shown, as they may be varied without departing from our invention.

What we claim as new, and desire to secure by Letters Patent, is as follows:

1. In an apparatus for measuring the distance of a distant object, the combination of two reflectors located at a distance apart and each adapted to reflect an independent image, an object-glass arranged to receive said independently-reflected images, and a partition arranged in a plane intersecting said object-glass and adapted to prevent confusion of the images refracted thereby, whereby two independent and differently-located images may be refracted by said object-glass, the difference in location of said images depending on the distance of the object viewed and the distance between the reflectors.

2. In an apparatus for measuring the distance of a distant object, the combination of two reflectors located at a distance apart and each adapted to reflect an independent image, an object-glass arranged to receive said independently-reflected images, and a partition arranged in a plane intersecting said object-glass and adapted to prevent confusion of the images refracted thereby, whereby two independent and differently-located images may be refracted by said object-glass, the difference in location of said images depending on the distance of the object viewed and the distance between the reflectors, and a scale located adjacent to said object-glass expressing the distances between said images in terms of the distance of the object from the reflectors.

3. In an apparatus for measuring the distance of a distant object, the combination of two reflectors located at a distance apart and each adapted to reflect an independent image, an object-glass arranged to receive said independently-reflected images, a partition arranged in a plane intersecting said object-glass and adapted to prevent confusion of the images thereby, whereby two independent and differently-located images may be refracted by said object-glass, the difference in location of said images depending on the distance of the object viewed and the distance between the reflectors, a scale located adjacent to said object-glass expressing the distances between the said images in terms of the distance of the object from the reflectors, and having an index-point located in the direct line of reflection of one of said reflectors.

4. In an apparatus for measuring the distance of a distant object, the combination of two reflectors located at a distance apart and each adapted to reflect an independent image, an object-glass arranged to receive said independently-reflected images, a lens arranged in front of said object-glass and adapted to receive the images refracted thereby and a partition arranged between said object-glass and lens in a plane intersecting them to prevent confusion of the images refracted thereby.

5. In an apparatus for measuring the distance of a distant object, the combination of two reflectors located at a distance apart, and each adapted to reflect an independent image, an object-glass arranged to receive said independently-reflected images, a lens arranged in front of said object-glass and adapted to receive the images refracted thereby, a partition arranged between said object-glass and lens in a plane intersecting them to prevent confusion of the images refracted thereby, and a reflector arranged in front of said lens and adapted to reflect the images refracted thereby.

6. In an apparatus for measuring the distance of a distant object, the combination of two reflectors located at a distance apart and each adapted to reflect an independent image, an object-glass arranged to receive said independently-reflected images, a lens arranged in front of said object-glass and adapted to receive the image refracted thereby, a partition arranged between said object-glass and lens in a plane intersecting them to prevent confusion of the images refracted thereby, and a scale located in the focus between said object-glass and lens on one side of said partition expressing the distance between said images in terms of the distance of the object from the reflectors.

7. In an apparatus for measuring the distance of a distant object, the combination of two reflectors located at a distance apart and each adapted to reflect an independent image, the outer or more distant reflector being of larger area than the inner reflector, an object-glass arranged to receive said independently-reflected images, a lens arranged in front of said object-glass and adapted to receive the images refracted thereby, a partition arranged between said object-glass and lens in a plane intersecting them to prevent confusion of the images refracted thereby.

8. In an apparatus for measuring the distance of distant objects, the combination of a tube having sight-openings in its side, two independent reflectors arranged at an angle within said tube adjacent to said sight-openings and adapted to reflect two independent images longitudinally through said tube, an object-glass carried by said tube and located in the line of the rays reflected by said reflectors, and a partition arranged in a plane intersecting said object-glass to prevent confusion of the images refracted thereby.

9. In an apparatus for measuring the distance of distant objects, the combination of a tube having sight-openings in its side, two independent reflectors arranged at an angle within said tube adjacent to said sight-openings and adapted to reflect two independent images longitudinally through said tube, an object-glass carried by said tube and located in the line of the rays reflected by said reflectors an extension of said tube beyond said object-glass, lens in said extension, and a partition arranged in said extensions beyond said lens and object-glass in a plane intersecting said object-glass and lens to prevent confusion of the images refracted thereby.

10. In an apparatus for measuring the distance of distant objects, the combination of a tube having sight-openings in its side, two independent reflectors arranged at an angle within said tube adjacent to said sight-openings and adapted to reflect two independent images longitudinally through said tube, an object-glass carried by said tube and located in the line of the rays reflected by said reflectors, an extension of said tube beyond said object-glass, lens in said extension, a partition arranged in said extensions beyond said lens and object-glass in a plane intersecting said object-glass and lens to prevent confusion of the images refracted thereby, and a scale located between said lens and object-glass expressing the distances between said images in terms of the distance of the object from the reflector.

11. In an apparatus for measuring the distance of distant objects, the combination of a tube having sight-openings in its side, two independent reflectors arranged at an angle within said tube adjacent to said sight-openings and adapted to reflect two independent images longitudinally through said tube, an object-glass carried by said tube and located in the line of the rays reflected by said reflectors, an extension of said tube beyond said object-glass, a lens in said extension, a partition arranged in said extensions beyond said lens and object-glass in a plane intersecting said object-glass and lens to prevent confusion of the images refracted thereby, and a scale located between said lens and object-glass expressing the distance between said images in terms of the distance of the object from the reflector, and having an index-point located in the direct line of reflection of one of said reflectors.

12. In an apparatus for measuring the distance of distant objects, the combination of a tube having sight-openings in its side, two independent reflectors arranged at an angle within said tube adjacent to said sight-openings and adapted to reflect two independent images longitudinally through said tube, an object-glass carried by said tube and located in the line of the rays reflected by said reflectors, an extension of said tube beyond said object-glass having its extremity bent at an angle, a partition arranged in said extension beyond said lens and object-glass in a plane intersecting said object-glass and lens to prevent confusion of the images refracted thereby, and a reflector arranged at an angle at the bent extremity of said extension.

13. In an apparatus for measuring the distance of a distant object, the combination with two independent reflectors located at a distance apart, the object-glass and partition arranged in a plane intercepting said object-glass, all substantially in the manner and for the purpose described, of a scale arranged in front of said object-glass laid off in distances proportional to the angles formed at the object at different distances by the rays reflected from said object by independent reflectors.

14. In an apparatus for measuring the distance of a distant object, the combination with the two independent reflectors located at a distance apart, the object-glass and partition arranged in a plane intercepting said object-glass, all substantially and for the purposes described, of a scale arranged in front of said object-glass laid off in distances formed by a line parallel to the line between said reflectors intercepting the lines of the rays from said object to said reflectors at different distances.

In testimony of which invention we hereunto set our hands.

THOMAS D. BROWN.
GEORGE W. HAUSE.
JOS. H. HAUSE.

Witnesses:
ERNEST HOWARD HUNTER,
R. M. KELLY.